(12) United States Patent
Daiku et al.

(10) Patent No.: US 7,489,347 B2
(45) Date of Patent: Feb. 10, 2009

(54) METHOD AND CIRCUIT FOR DETECTING FLICKER NOISE

(75) Inventors: Hiroshi Daiku, Kawasaki (JP); Asao Kokubo, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 791 days.

(21) Appl. No.: 10/943,933

(22) Filed: Sep. 20, 2004

(65) Prior Publication Data

US 2005/0206745 A1    Sep. 22, 2005

(30) Foreign Application Priority Data

Mar. 17, 2004    (JP)    ............................. 2004-076908

(51) Int. Cl.
*H04N 9/73* (2006.01)
(52) U.S. Cl. .................................................. 348/228.1
(58) Field of Classification Search .............. 348/226.1, 348/227.1, 228.1
See application file for complete search history.

(56) References Cited

U.S. PATENT DOCUMENTS

| | | | |
|---|---|---|---|
| 6,630,953 B1 * | 10/2003 | Toyoda et al. ............ | 348/226.1 |
| 6,710,818 B1 * | 3/2004 | Kasahara et al. .......... | 348/226.1 |
| 6,882,363 B1 * | 4/2005 | Oda et al. ................. | 348/226.1 |
| 7,397,503 B2 * | 7/2008 | Baer et al. ................ | 348/226.1 |
| 2002/0158971 A1 | 10/2002 | Daiku et al. | |
| 2004/0001153 A1 * | 1/2004 | Kikukawa et al. ......... | 348/226.1 |
| 2004/0016919 A1 * | 1/2004 | Daiku et al. ................. | 257/14 |

FOREIGN PATENT DOCUMENTS

| | | |
|---|---|---|
| JP | 2000-165752 | 6/2000 |
| JP | 2002-330350 | 11/2002 |

* cited by examiner

*Primary Examiner*—Lin Ye
*Assistant Examiner*—Jason Whipkey
(74) *Attorney, Agent, or Firm*—Arent Fox LLP

(57) ABSTRACT

A flicker noise detecting method that shortens the time for detecting flicker noise. The method sets two of a plurality of horizontal lines forming a frame as average brightness calculation regions that are separated from each other by the predetermined number of the horizontal lines, calculates an average brightness of the two average brightness calculation regions for each of three frames, multiplies each average brightness by a product sum calculation coefficient, and adds the products to generate a sum and generate a detection signal of flicker noise based on the sum. The product sum calculation coefficient is obtained by plotting one cycle of a sine wave and one cycle of a cosine wave at intervals of $\pi/3$.

21 Claims, 17 Drawing Sheets

Fig.1 (Prior Art)
Fig.2 (Prior Art)
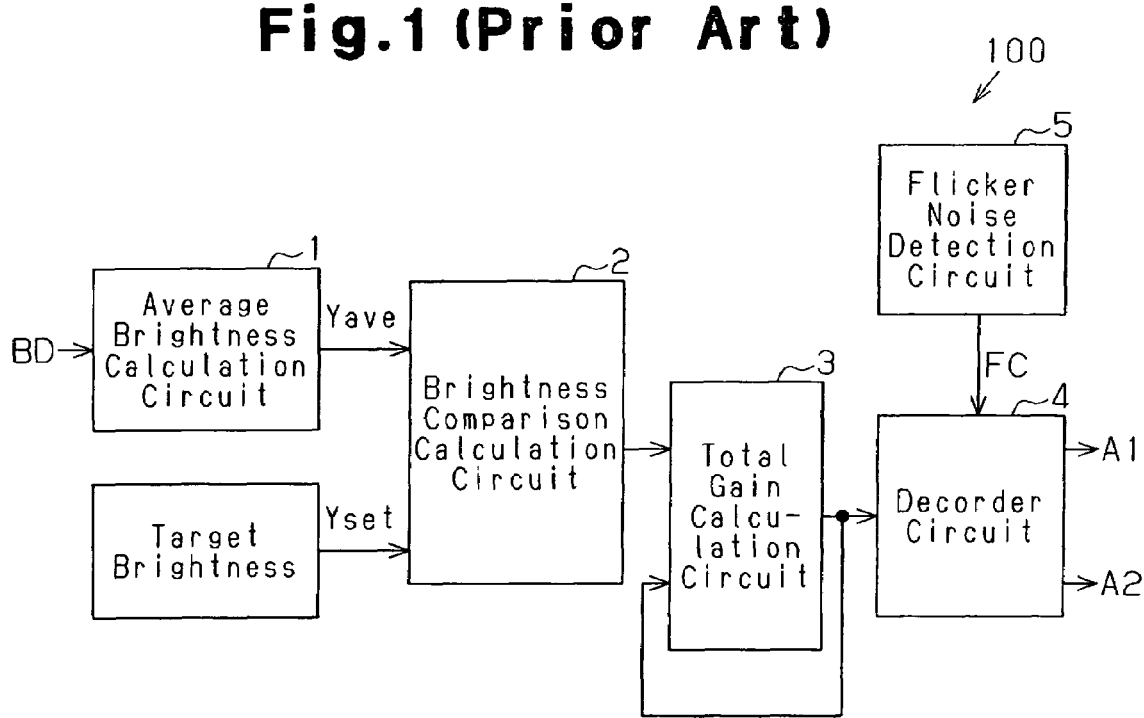
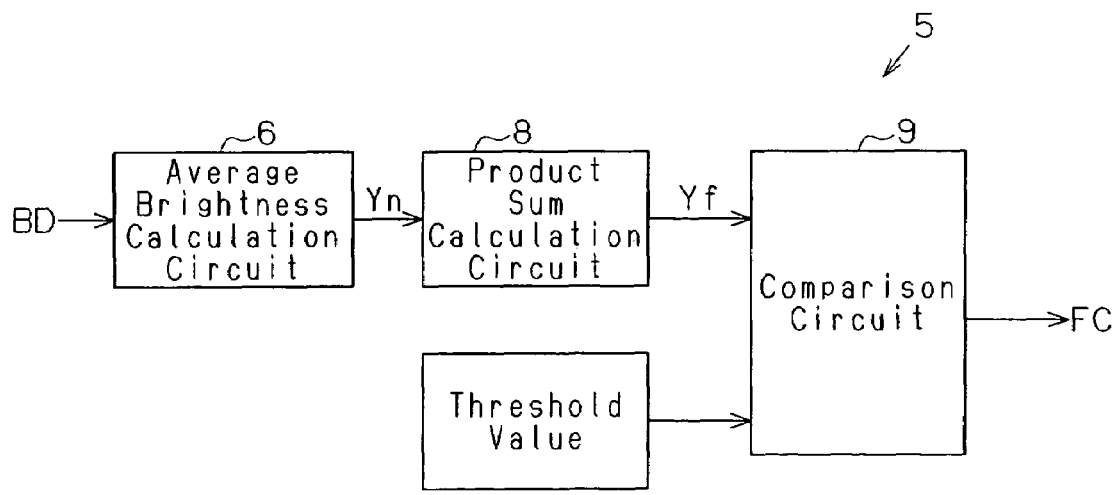

METHOD AND CIRCUIT FOR DETECTING FLICKER NOISE

CROSS-REFERENCE TO RELATED APPLICATIONS

This application is based upon and claims the benefit of priority from prior Japanese Patent Application No. 2004-076908, filed on Mar. 17, 2004, the entire contents of which are incorporated herein by reference.

BACKGROUND OF THE INVENTION

The present invention relates to a method for detecting flicker noise, and more particularly, to a method for detecting flicker noise produced when generating an image with an imaging device, such as a digital still camera or a digital video camera, indoors near a fluorescent light.

A fluorescent light may be used as a lighting device in a room. In such a room, when an imaging device, such as a digital still camera or a digital video camera, is used to generate an image, the generated image may include flicker noise in accordance with the relationship between the exposure time of photoelectric conversion elements, which configure an image sensor, and the fluorescence frequency of the fluorescent light. In Japan, the AC power frequency differs between regions. This results in fluorescent lights having different fluorescence frequencies. Thus, flicker noise is produced under different conditions. Under such circumstances, it is required that the detection of flicker noise be ensured and performed quickly to reduce flicker noise.

In regions of Japan where the AC power frequency is 50 Hz, the fluorescence frequency of a fluorescent light is 100 Hz. In the other regions of Japan where the AC power frequency is 60 Hz, the fluorescence frequency of a fluorescent light is 120 Hz. An auto gain control (AGC) circuit is incorporated in a digital still camera or a digital video camera. The brightness of an imaging subject ranges from a high level to a low level. Thus, the AGC circuit automatically adjusts the frame rate in accordance with the brightness of the imaging subject.

In an XY address type CMOS image sensor, photoelectric conversion elements are respectively connected to horizontal selection lines. The total of the vertical scanning period and the vertical blanking period from the first horizontal selection line to the final horizontal selection line corresponds to a cycle of one frame.

For example, when the image sensor is operating at a frame rate of 30 fps, a cycle is 1/30 seconds per frame. In this cycle, each horizontal selection line is provided with a reset signal and a read signal. The time from when the reset signal is provided to when the read signal is provided corresponds to the exposure time (integration time or signal storage time) of each photoelectric conversion element.

When the cycle of one frame is 1/30 seconds and the fluorescence cycle of the fluorescent light is 1/120 seconds, integer multiples (four times) of the fluorescence cycle of the fluorescent light coincide with the cycle of one frame. Accordingly, the timings for starting and ending the integration operation of the photoelectric conversion element connected to each horizontal selection line becomes the same at the nth frame and the following (n+1)th frame. Thus, in the image plane, the brightness of each horizontal line corresponding to a horizontal selection line is fixed for each frame.

The timings for starting and ending the integration operation for different horizontal selection lines in the same frame are all not the same for the fluorescent cycle of the fluorescent light. Thus, a bright and dark horizontal stripe appears for four cycles on an image plane. This phenomenon is flicker noise that appears in an image generated under a fluorescent light having a fluorescent cycle of 1/120 second.

When the cycle of one frame is 1/30 second and the fluorescent cycle of the fluorescent light is 1/100 second, integer multiples of the fluorescence cycle does not coincide with the cycle of one frame. Approximately 3.3 times the fluorescence cycle of the fluorescent light coincides with one frame. Accordingly, the timings for starting and ending the integration operation of the photoelectric conversion element connected to each horizontal selection line are not the same for the nth frame and the following (n+1)th frame. Thus, in the image plane, the brightness of each horizontal line corresponding to a horizontal selection line is not fixed for each frame.

The timings for starting and ending the integration operation for different horizontal selection lines in the same frame are all not the same for the fluorescent cycle of the fluorescent light. Thus, a bright and dark horizontal stripe appears for 3.3 cycles moving upward or downward on the image plane. This phenomenon is flicker noise that appears in an image generated under a fluorescent light having a fluorescent cycle of 1/100 second. Japanese Laid-Open Patent Publication no. 2002-330350 describes the occurrence of the flicker noise.

To prevent flicker noise from being produced under a fluorescent light having a fluorescence cycle of 1/120 seconds, in a range in which the cycle of one frame is 1/30 seconds, the integration time of each photoelectric conversion element is set to an integer multiple of 1/120 seconds, that is, 1/120 seconds, 2/120 seconds, 3/120 seconds, or 4/120 seconds.

However, an integration time that enables the prevention of flicker noise for both of the fluorescence cycles 1/120 seconds and 1/100 seconds does not exist in the frame cycle of 1/30 seconds.

Accordingly, an imaging device incorporating an auto gain control (AGC) circuit, which adjusts the brightness of the generated image, has been proposed. The AGC circuit determines the fluorescence cycle of a fluorescent light and adjusts the integration time of each photoelectric conversion element in accordance with the fluorescence cycle.

FIG. 1 shows an example of an AGC circuit 100, which is provided with a flicker noise cancellation function. The AGC circuit 100 includes an average brightness calculation circuit 1, a brightness ratio calculation circuit 2, a total gain calculation circuit 3, a decoder circuit 4, and a flicker noise detection circuit 5. The average brightness calculation circuit 1 receives brightness data BD from an image sensor block and calculates an average brightness Yave for each frame based on the brightness data BD. The brightness ratio calculation circuit 2 calculates the ratio between the average brightness Yave and a predetermined target brightness Yset. Then, the brightness ratio calculation circuit 2 provides an output signal representing the ratio to the total gain calculation circuit 3.

The total gain calculation circuit 3 holds the total gain of the previous frame and calculates the total gain of the present frame based on the output signal of the brightness ratio calculation circuit 2 and the total gain of the previous frame.

The decoder circuit 4 receives the total gain from the total gain calculation circuit 3 and, based on the total gain, generates a gain adjustment signal A1 and an integration time adjustment signal A2. The gain adjustment signal A1 is used to adjust the gain of an amplifier in the image sensor block. The integration time adjustment signal A2 is used to adjust the integration time for each of the photoelectric conversion elements.

The flicker noise detection circuit 5 detects whether the fluorescent light fluorescence cycle is 1/100 or 1/120 seconds, that is, whether the AC power frequency is 50 Hz or 60 Hz, and provides a corresponding detection signal FC to the decoder circuit 4. Based on the detection signal FC, the decoder circuit 4 generates the integration time adjustment signal A2 for selecting the integration time that prevents flicker noise when the fluorescence cycle is 1/100 seconds or the integration time that prevents flicker noise when the fluorescence cycle is 1/120 seconds.

The flicker noise detection circuit 5 will now be discussed with reference to FIG. 2. The flicker noise detection circuit 5 includes an average brightness calculation circuit 6, a product sum calculation circuit 8, and a comparison circuit 9. The average brightness calculation circuit 6 is provided with the brightness data BD output from the image block sensor. Referring to FIG. 5, the average brightness calculation circuit 6 calculates the average brightness at two predetermined average brightness calculation regions 7a and 7b of the image block sensor for each frame.

The average brightness calculation regions 7a and 7b correspond to two horizontal lines that are separated from each other by a predetermined quantity D of horizontal lines. The quantity D is represented by the following equation:

$$D = V \times (1/2 - (\text{remainder of } A/B))/(A/B)$$

In the equation, A represents the fluorescent light fluorescence frequency Hz, V represents the total number of horizontal selection lines, and B represents the frame rate fps.

As described in Japanese Laid-Open Patent Publication No. 2002-330350, from the horizontal lines in a frame, the horizontal line having the maximum brightness and the horizontal line having the minimum brightness are selected as the average brightness calculation regions 7a and 7b, which are separated from each other by the quantity D of horizontal lines.

For example, when the fluorescence cycle is 1/100 seconds and the frame rate is 30 fps, the quantity D of the horizontal lines between the average brightness calculation regions 7a and 7b is set to 1/20 of the total number V of horizontal selection lines.

The product sum calculation circuit 8 receives the average brightness Yn of the average brightness calculation regions 7a and 7b calculated by the average brightness calculation circuit 6. Then, the product sum calculation circuit 8 uses the average brightness Yn for each of 15.5 frames to perform product sum calculation and generate a product sum calculation value Yf.

The comparison circuit 9 compares the product sum calculation value Yf with a predetermined threshold value to generate the detection signal FC, which indicates whether the fluorescence cycle is 1/120 or 1/100 when an image is being generated. For example, based on the integration time adjustment signal A2 output from the decoder circuit 4, in a state in which the integration time for preventing flicker noise at a fluorescent cycle of 1/120 is selected, the product sum calculation value Yf is greater than the threshold value when the brightness data BD is generated in a state in which the fluorescence cycle is 1/100 seconds. In a state in which the integration time for preventing flicker noise at a fluorescent cycle of 1/120 is selected, the product sum calculation value Yf is less than the threshold value when the brightness data BD is generated in a state in which the fluorescence cycle is 1/120 seconds.

FIG. 3 shows the product sum calculation circuit 8 in detail. The product sum calculation circuit 8 includes thirty-one stages of shift registers 10 and multipliers 11 and 12. Further, the product sum calculation circuit 8 includes adders 13, 14, and 15. The average brightness Yn of the average brightness calculation regions 7a and 7b for each of the 15.5 frames is sequentially transferred from the first one of the thirty-one series-connected shift registers 10 to the latter ones and stored. Product sum calculation is started when the average brightness Y0 to Y30 for 15.5 frames is stored in the thirty-one stages of shift registers 10. The thirty-one multipliers 11 multiply each average brightness Y0 to Y31 stored in the thirty-one stages of the shift registers 10 with predetermined coefficients cos 0 to cos 30, respectively. The thirty-one multipliers 12 multiply the average brightness Y0 to Y31 stored in the thirty-one stages of the shift registers 10 with predetermined coefficients sin 0 to sin 30, respectively.

The adder 13 receives the output of each multiplier 11 and adds the outputs to calculate the absolute value of the sum. The adder 14 receives the output of each multiplier 12 and adds the outputs to calculate the absolute value of the sum. The adder 15 adds the two absolute values from the adders 13 and 14 and provides the product sum calculation value Yf to the comparison circuit 9.

Referring to FIG. 4, the coefficients cos 0 to cos 30 and sin 0 to sin 30 used by the product sum calculation circuit 8 are values obtained by plotting a cosine wave 16 and a sine wave 17 at intervals of π/3. Each coefficient is determined so that the total sum of the coefficients cos 0 to cos 30 is zero and the total sum of the coefficients sin 0 to sin 30 is zero.

In such a configuration, if the integration time that prevents flicker noise when the fluorescence cycle is 1/120 seconds is selected, flicker noise is not produced and the product sum calculation value Yf decreases to a value close to zero when the fluorescence cycle is 1/120 seconds during the generation of an image.

If the integration time that prevents flicker noise when the fluorescence cycle is 1/120 seconds is selected, flicker noise is produced and the product sum calculation value Yf is increased when the fluorescence cycle is 1/100 seconds during the generation of an image.

Accordingly, the flicker noise detection circuit 5 functions to determine whether an image is being generated in a state in which the fluorescent light fluorescence cycle is 1/100 seconds or 1/120 seconds. During the generation of an image in a state in which the fluorescent light fluorescence cycle is 1/100 seconds, based on the detection signal FC output from the flicker noise detection circuit 5, the decoder circuit 4 selects the integration time that prevents flicker noise from being produced and outputs the integration time adjustment signal A2.

SUMMARY OF THE INVENTION

In the conventional flicker noise detection circuit 5, after the product sum calculation circuit 8 stores the average brightness Y0 to Y30 of the average brightness calculation regions 7a and 7b for 15.5 frames, the product sum calculation is performed and a detection signal is obtained. Accordingly, a certain amount of time is required to obtain the detection signal FC for the flicker noise. Especially, as the frame rate fps decreases, for example, from 30 fps to 15 fps and then to 7.5 fps, the time required for obtaining the detection signal FC becomes longer.

Further, referring to FIG. 6, during the detection of flicker noise, the integration time selected based on the integration time adjustment signal A2 output from the decoder circuit 4 is varied in steps, such as maximum integration time (maximum signal storage time) Max (cycle of one frame)×1, Max×0.75, Max×0.5, and Max×0.25. This decreases the frame rate to, for example, 15 fps, 7.5 fps, and 3.75 fps. When the integration time for Max×0.75 is selected, an integration time m/20, during which there is no flicker noise, exists not only when the fluorescence cycle is 1/120 seconds but also when the fluorescence cycle is 1/100 seconds. In other words, when the integration time for Max×0.75 is selected, the detection of whether the fluorescent light fluorescence cycle is 1/120 seconds or 1/100 seconds cannot be detected.

The cycle of one frame for the frame rates 15 fps, 7.5 fps, and 3.75 fps may be represented by $2^n/30$ seconds. Accordingly, Max×1 is represented by the following expression.

$$\frac{2^n}{30} \times 1.0 \neq \frac{m}{20}$$

Max×0.75 is represented by the following expression.

$$\frac{2^n}{30} \times \frac{3}{4} = \frac{2^{n-1}}{20} = \frac{m}{20}$$

Max×0.5 is represented by the following expression.

$$\frac{2^n}{30} \times \frac{1}{2} = \frac{2^{n-1}}{30} \neq \frac{m}{20}$$

Max×0.25 is represented by the following expression.

$$\frac{2^n}{30} \times \frac{1}{4} = \frac{2^{n-2}}{30} \neq \frac{m}{20}$$

In this manner, when m/20 seconds, which is the integration time for Max×0.75, is selected, since the quantity D of the horizontal lines between the average brightness calculation regions 7a and 7b is 1/20 of the total number V of the horizontal selection lines, flicker noise is not produced when the fluorescent light fluorescence frequency is 100 Hz (fluorescence cycle 1/100 seconds). Thus, flicker noise cannot be detected. Accordingly, since there is an integration time in which flicker noise cannot be detected, an erroneous detection circuit is output from the flicker noise detection circuit.

The present invention provides a method for detecting flicker noise that reduces the time for detecting flicker noise.

Further, the present invention provides a method and device for detecting flicker noise that reduces the time for detecting flicker noise and ensures the detection of flicker noise.

One aspect of the present invention is a method for detecting flicker noise in an image plane. The flicker noise is produced in image frames, which are each configured by a plurality of horizontal lines. The method includes setting two of the horizontal lines as average brightness calculation regions that are separated from each other by the predetermined number of the horizontal lines, calculating an average brightness of the two average brightness calculation regions for each of a plurality of frames in the image plane, multiplying each average brightness by a product sum calculation coefficient, and adding the products to generate a sum and generating a detection signal for flicker noise based on the sum. The product sum calculation coefficient is obtained by plotting one cycle of a sine wave and one cycle of a cosine wave at intervals of $\pi/3$.

A further aspect of the present invention is a method for detecting flicker noise in an image plane. The flicker noise is produced in image frames, which are each configured by a plurality of horizontal lines. The method includes setting two of the horizontal lines as average brightness calculation regions that are separated from each other by a distance set to a value other than 1/2, 1/5, 1/8, 1/20, and 1/80 of the total number of the horizontal lines per frame, calculating an average brightness of the two average brightness calculation regions for each of at least three frames in the image plane, multiplying each average brightness by a product sum calculation coefficient, and adding the products to generate a sum and generating a detection signal of flicker noise based on the sum. The product sum calculation coefficient is obtained by plotting one cycle of a sine wave and one cycle of a cosine wave at intervals of $\pi/3$.

Another aspect of the present invention is a method for detecting flicker noise in an image plane due to fluorescent light. The flicker noise is produced in image frames, which are each configured by a plurality of horizontal lines. The method includes generating an image plane based on a first integration time set for each horizontal line in correspondence with fluorescent light having a first fluorescence cycle, setting two of the horizontal lines as average brightness calculation regions that are separated from each other by the predetermined number of the horizontal lines, calculating an average brightness of the two average brightness calculation regions for each of a plurality of frames in the image plane, multiplying each average brightness by a product sum calculation coefficient, the product sum calculation coefficient being obtained by plotting one cycle of a sine wave and one cycle of a cosine wave at intervals of $\pi/3$, and adding the products to generate a sum and generating a detection signal for flicker noise based on the sum. When the detection signal indicates that flicker noise is included in the image plane, the first integration time is changed to a second integration time set for each horizontal line in correspondence with a fluorescent light having a second fluorescence cycle.

A further aspect of the present invention is a circuit for detecting flicker noise from brightness data generated in units of a frame. The circuit includes an average brightness calculation circuit for receiving the brightness data in units of a frame and calculating an average brightness of a predetermined average brightness calculation region. A product sum calculation circuit connected to the average brightness calculation circuit calculates a product sum calculation value with the average brightness in each of a plurality of frames and a predetermined product sum calculation coefficient. A comparison circuit connected to the product sum calculation circuit compares the product sum calculation value with a predetermined threshold value to generate a detection signal based on the comparison result. The product sum calculation coefficient is obtained by plotting one, two, or three cycles of a sine wave and of a cosine wave at intervals of $\pi/3$.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic block diagram of a prior art AGC circuit;

FIG. 2 is a schematic block diagram of a flicker noise detection circuit in the AGC circuit of FIG. 1;

DETAILED DESCRIPTION OF THE PREFERRED EMBODIMENTS

Figure 3:
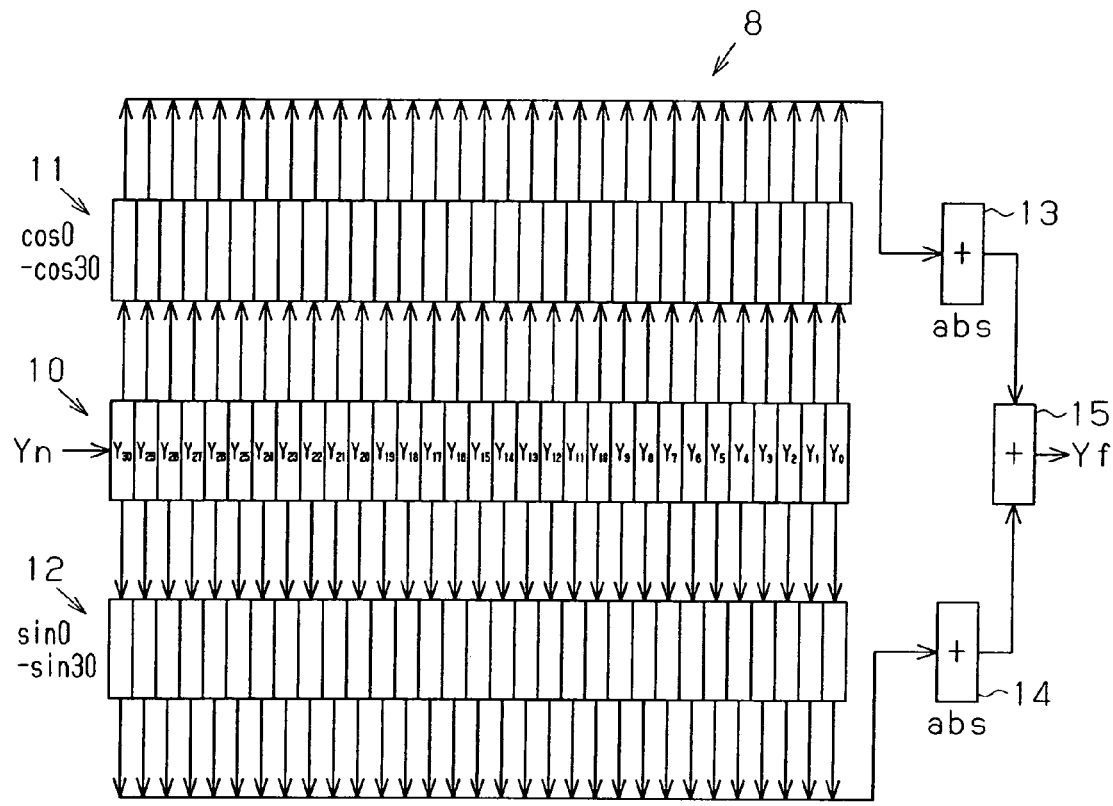
FIG. 3 is a schematic block diagram of a product sum calculation circuit in the flicker noise detection circuit of FIG. 1.
Figure 4:
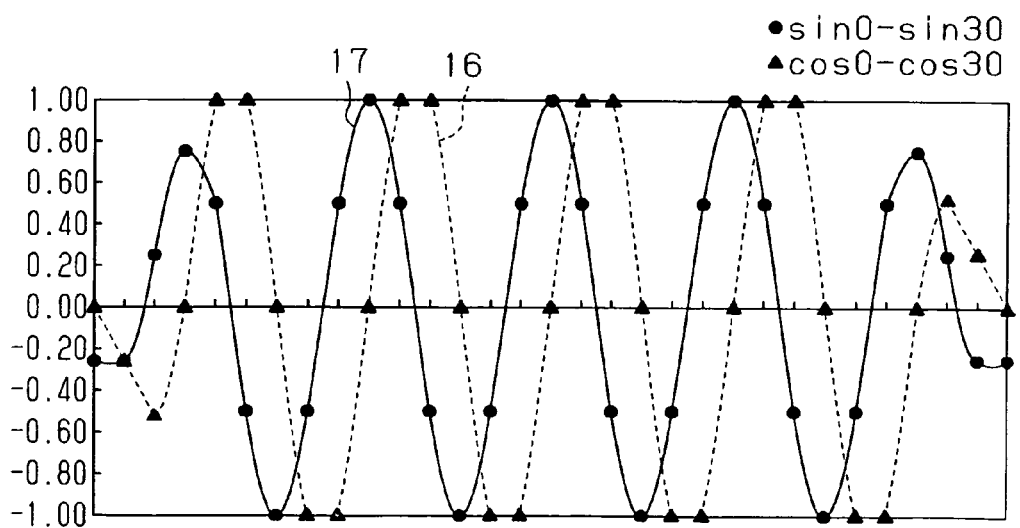
FIG. 4 is a diagram showing product sum calculation coefficients used in the product sum calculation circuit of FIG. 3.
Figure 5:
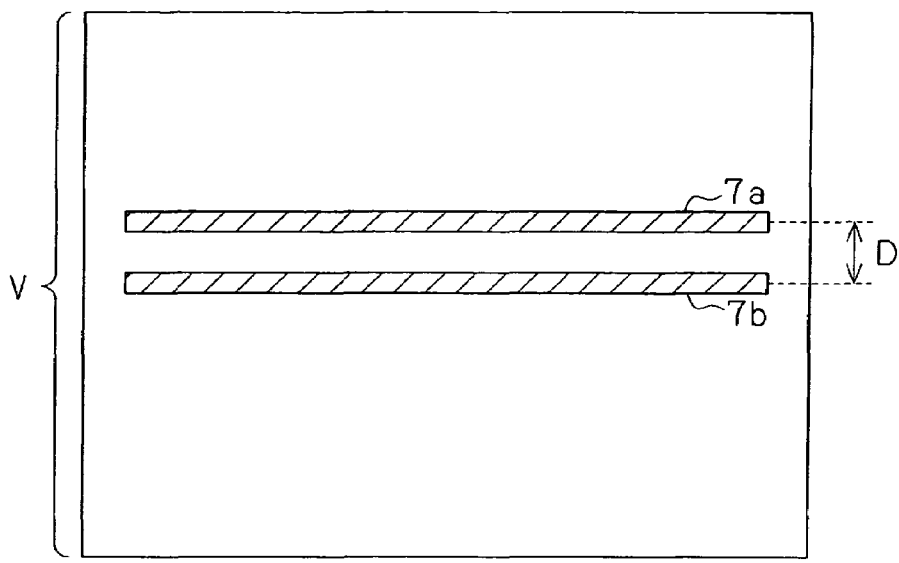
FIG. 5 is a diagram showing average brightness calculation regions in the prior art.
Figure 6:
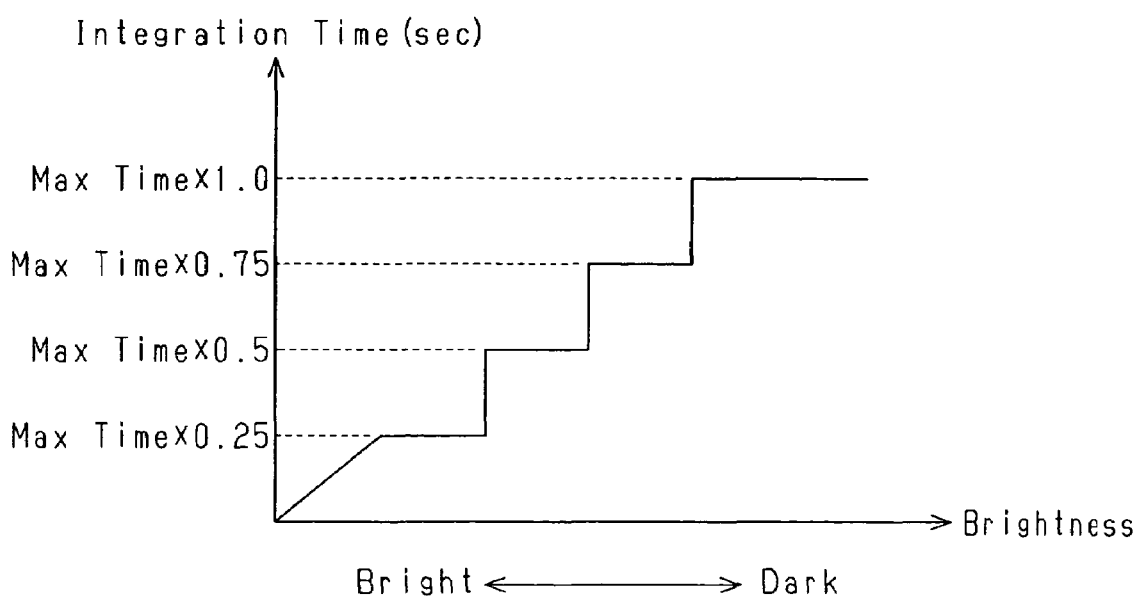
FIG. 6 is a diagram showing integration times selected by a decoder circuit during the detection of flicker noise.

An AGC circuit according to a preferred embodiment of the present invention will now be discussed. In the preferred embodiment, the selection of the integration time based on the integration time adjustment signal A2 output from the decoder circuit 4 during the detection of flicker noise and the configuration of the product sum calculation circuit 8 of the flicker noise detection circuit 5 are modified from the AGC circuit 100 shown in FIG. 1. The prior art AGC circuit 100 of FIG. 1 and the flicker noise detection circuit 5 of FIG. 2 function in the same manner as the AGC circuit and flicker noise detection circuit of the preferred embodiment except for the product sum calculation circuit 8 and the decoder circuit 4. Accordingly, in drawings showing the preferred embodiment, parts corresponding to those of the prior art are denoted with the same reference numbers except for a product sum calculation circuit 8a, which is shown in FIG. 7.

Figure 7:
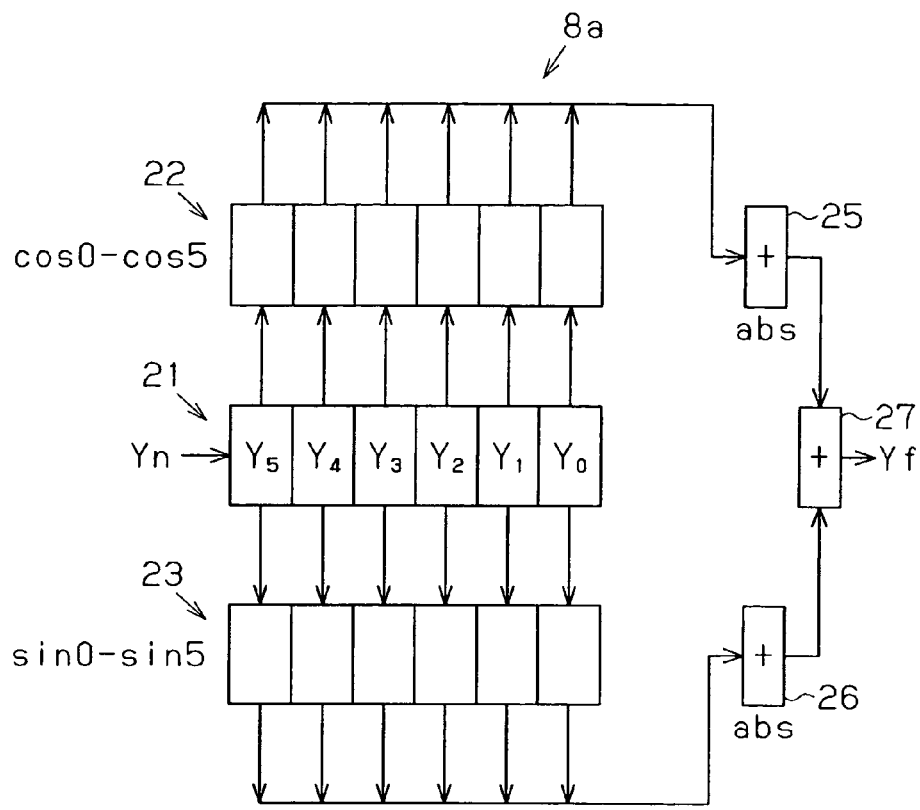
FIG. 7 is a schematic block diagram of a product sum calculation circuit according to a preferred embodiment of the present invention.

Referring to FIG. 7, in the preferred embodiment, a product sum calculation circuit 8a includes six stages of shift registers 21 and multipliers 22 and 23. Further, the product sum calculation circuit 8a includes adders 25, 26, and 27.

Figure 8:
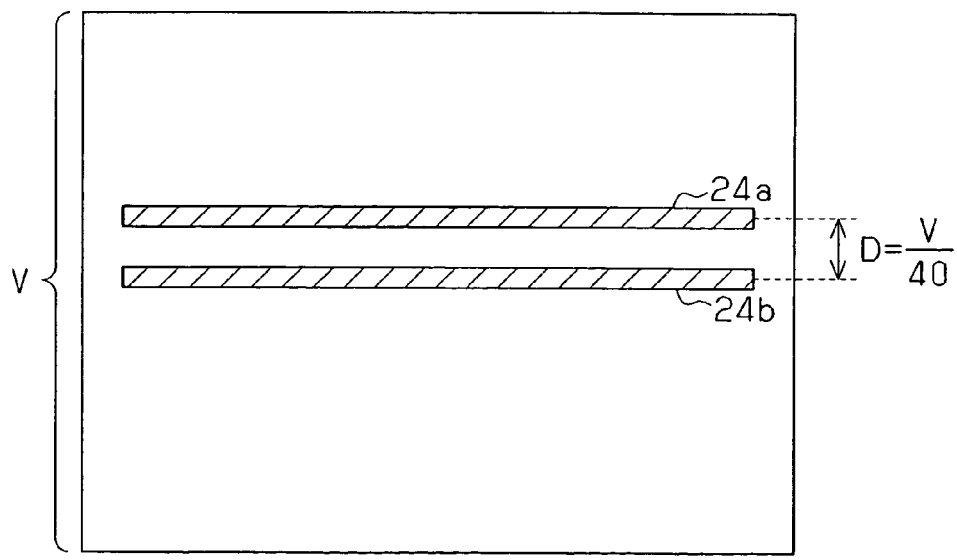
FIG. 8 is a diagram showing average brightness calculation regions.

FIG. 8 shows average brightness calculation regions 24a and 24b. The average brightness calculation regions 24a and 24b are defined by two predetermined horizontal lines on a generated image. When the total number of the horizontal lines is represented by V, the distance D between the horizontal lines of the average brightness calculation regions 24a and 24b is set to 1/40·V.

The average brightness Yn of the average brightness calculation regions 24a and 24b for three frames are sequentially provided to the first one of the six stages of series-connected shift registers 21 and then sequentially transferred to the latter shift registers 21.

Product sum calculation is started when the average brightness Y0 to Y5 for three frames is stored in the six stages of the shift registers 21. The multipliers 22 multiply each average brightness Y0 to Y5 stored in the six stages of the shift registers 21 with predetermined coefficients cos 0 to cos 5, respectively, and provides the products to the adder 25. The adder 25 adds the products of the six multipliers 21 to calculate the absolute value of the sum. The multipliers 23 multiply each average brightness Y0 to Y5 stored in the six stages of the shift registers 21 with predetermined coefficients sin 0 to sin 5, respectively, and provides the products to the adder 26. The adder 26 adds the products of the six multipliers 23 to calculate the absolute value of the sum.

The adder 27 receives the two absolute values from the adders 25 and 26 and adds the two absolute values to generate the product sum calculation value Yf. The product sum calculation value Yf is provided to the comparison circuit 9, which is shown in FIG. 2.

Figure 9:
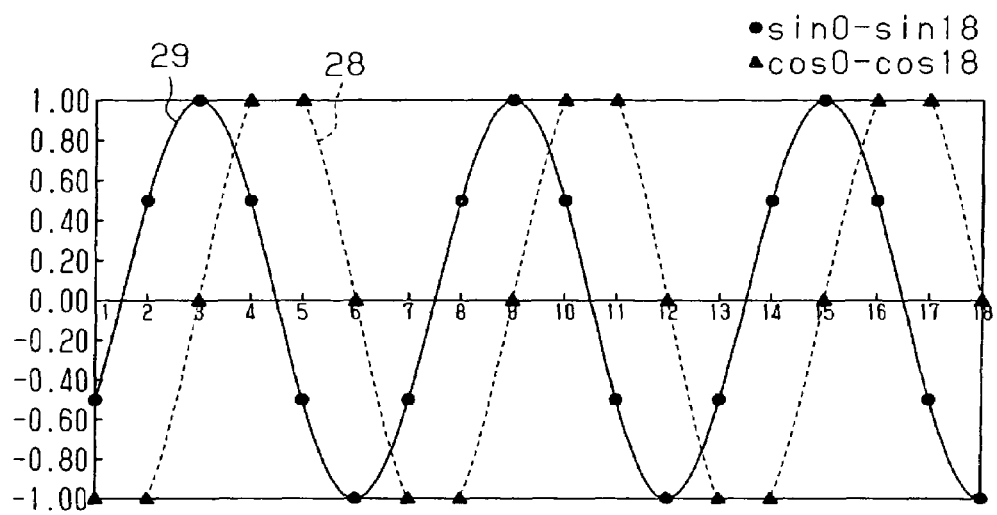
FIG. 9 is a diagram showing product sum calculation coefficients used in the product sum calculation circuit of FIG. 7.

Referring to FIG. 9, the coefficients cos 0 to cos 5 and sin 0 to sin 5 used for the product sum calculation circuit 8a are values obtained by plotting a cosine wave 28 and a sine wave 29 at intervals of $\pi/3$. Each coefficient is determined so that the total sum of the coefficients cos 0 to cos 5 is zero and the total sum of the coefficients sin 0 to sin 5 is zero. Although the coefficients cos 0 to cos 5 and sin 0 to sin 5 are obtained by plotting one cycle of the cosine wave 28 and the sine wave 29 by intervals of π/3, FIG. 9 shows three cycles of the cosine wave 28 and the sine wave 29.

A simulation result for checking the operation of the product sum calculation circuit 8a will now be discussed.

Figure 11:
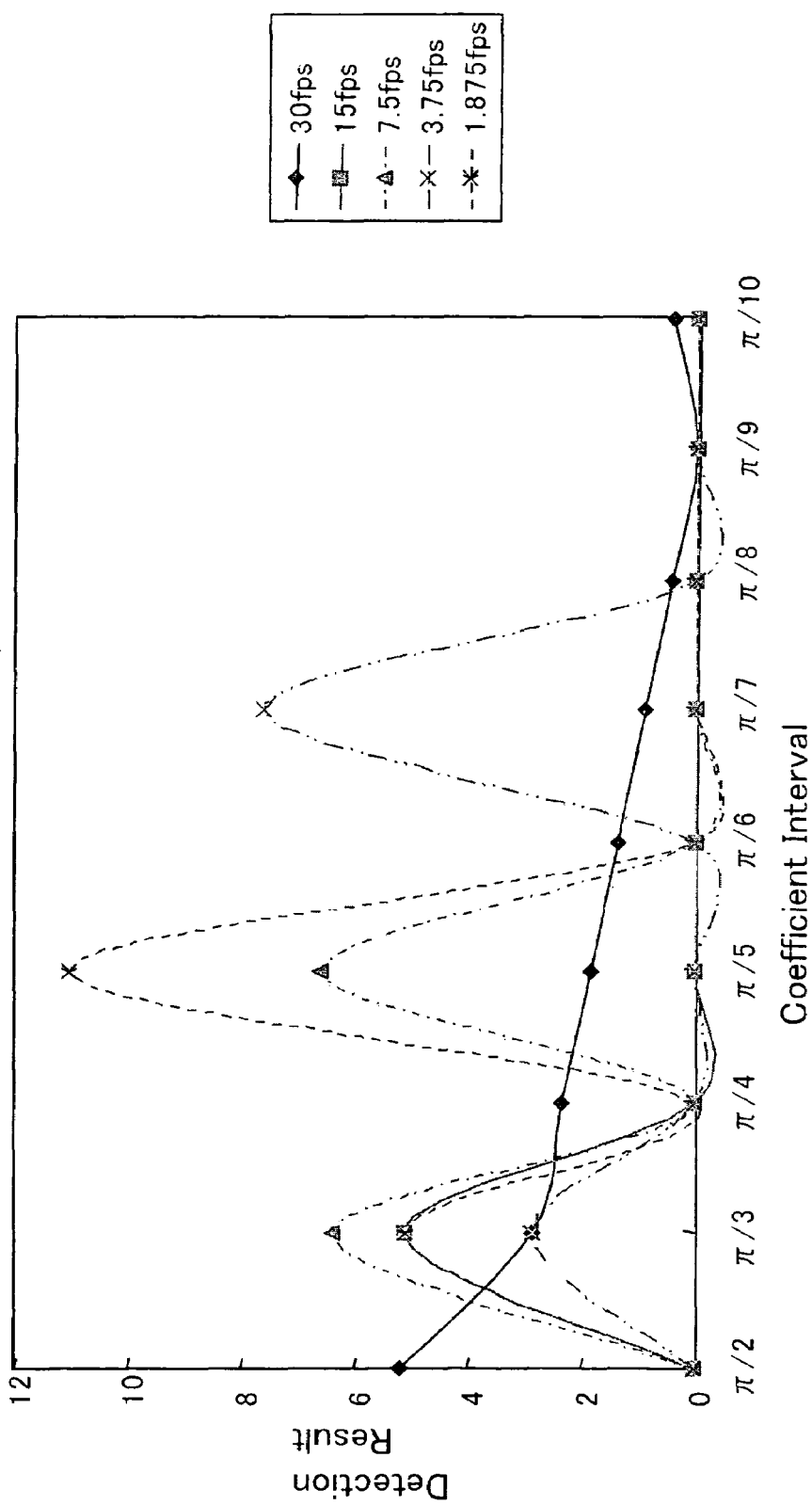
FIG. 11 is a graph showing the relationship of the calculation coefficient interval and detection results when the line interval is 1/6·V.

FIGS. 11 to 16 show the relationship of detection results and the interval (plot timing) of calculation coefficients cos 0 to cos 5 and sin 0 to sin 5 in accordance with different distances D between the average brightness calculation regions 24a and 24b. FIG. 11 shows the relationship of the detection results and the interval of the calculation coefficients cos 0 to cos 5 and sin 0 to sin 5 for the frame rates of 30 fps, 15 fps, 7.5 fps, 3.75 fps, and 1.875 fps when the distance D is set to 1/6 of the total number V of horizontal lines.

Figure 12:
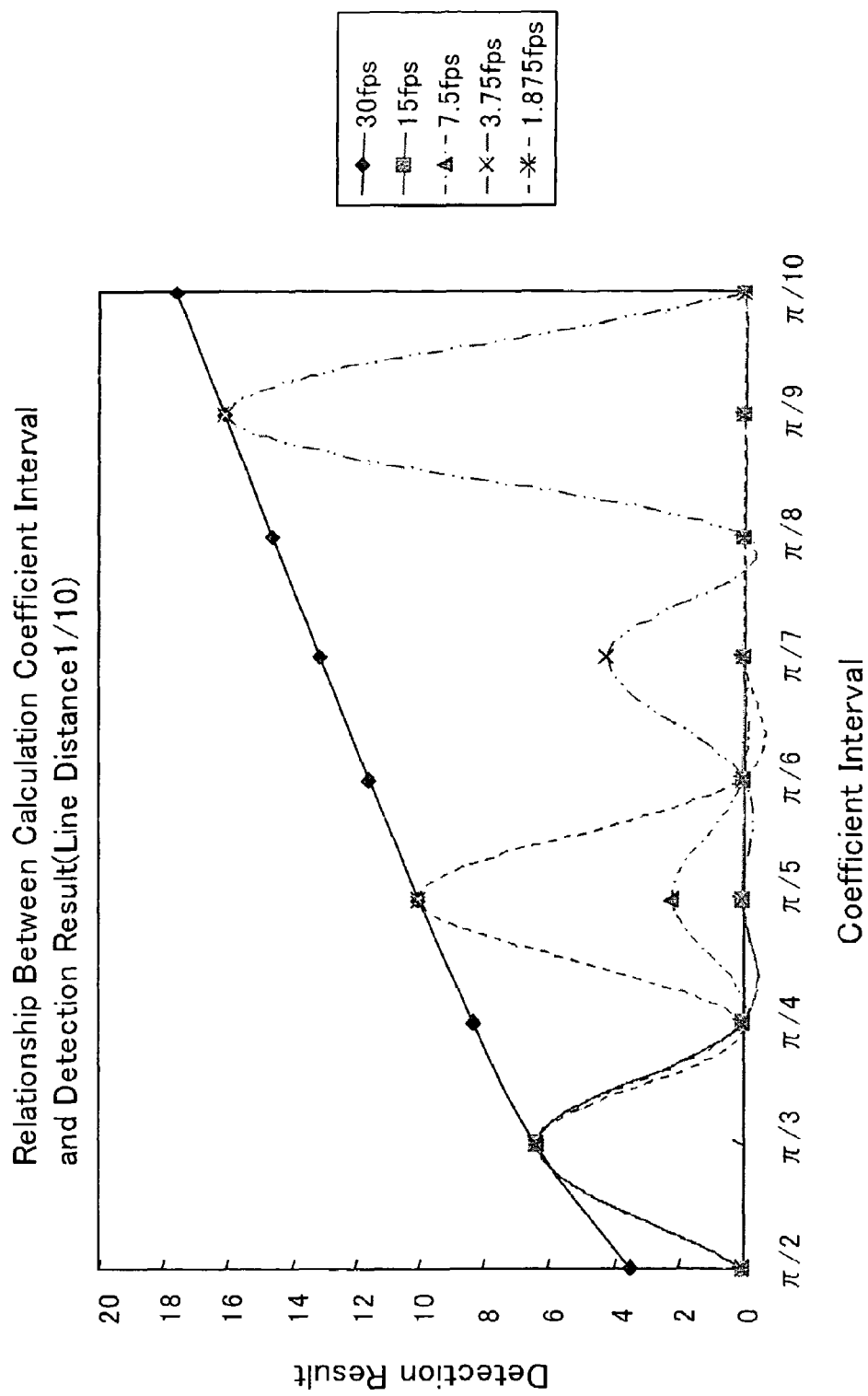
FIG. 12 is a graph showing the relationship of the calculation coefficient interval and detection results when the line interval is 1/10·V.
Figure 13:
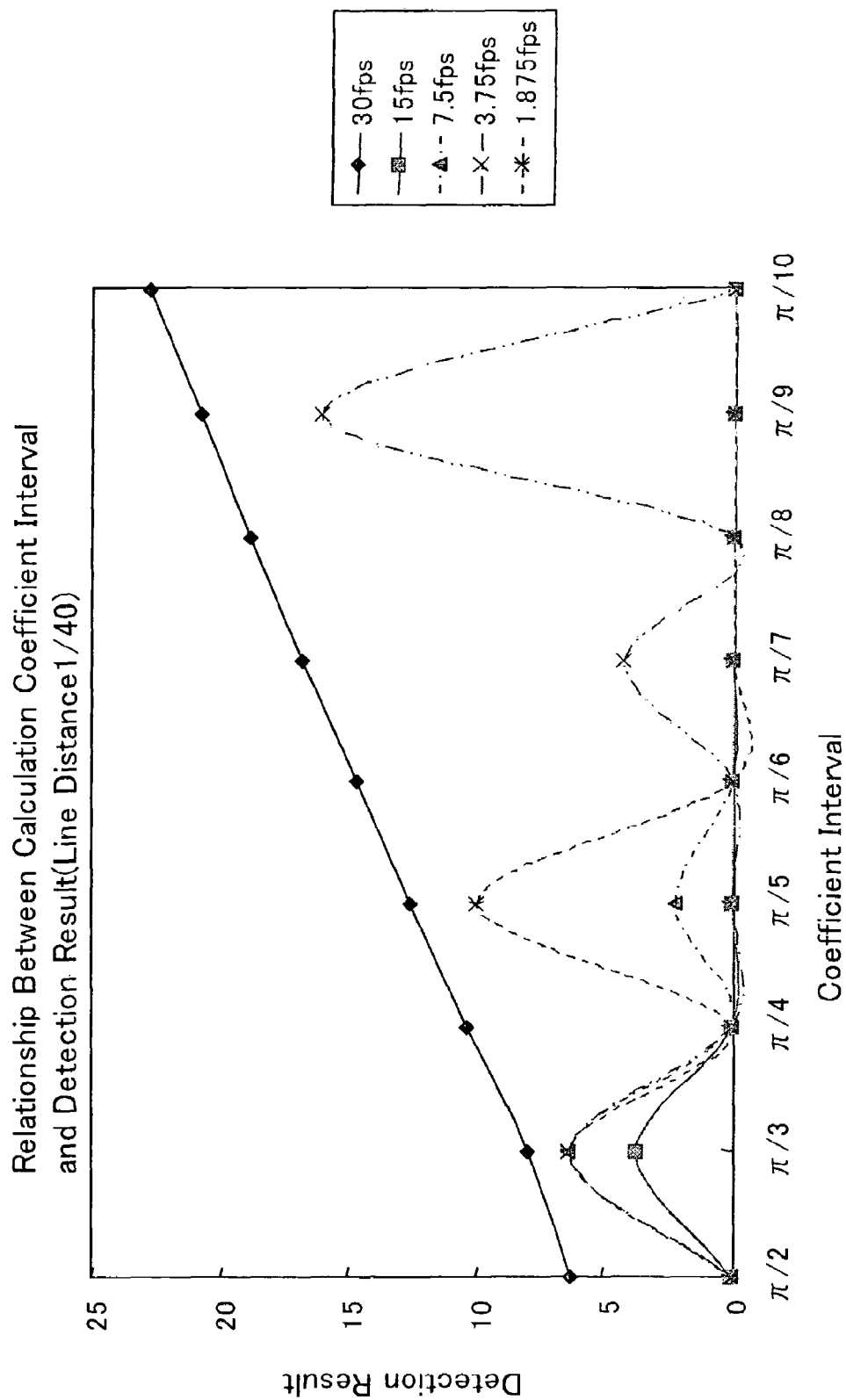
FIG. 13 is a graph showing the relationship of the calculation coefficient interval and detection results when the line interval is 1/40·V.
Figure 14:
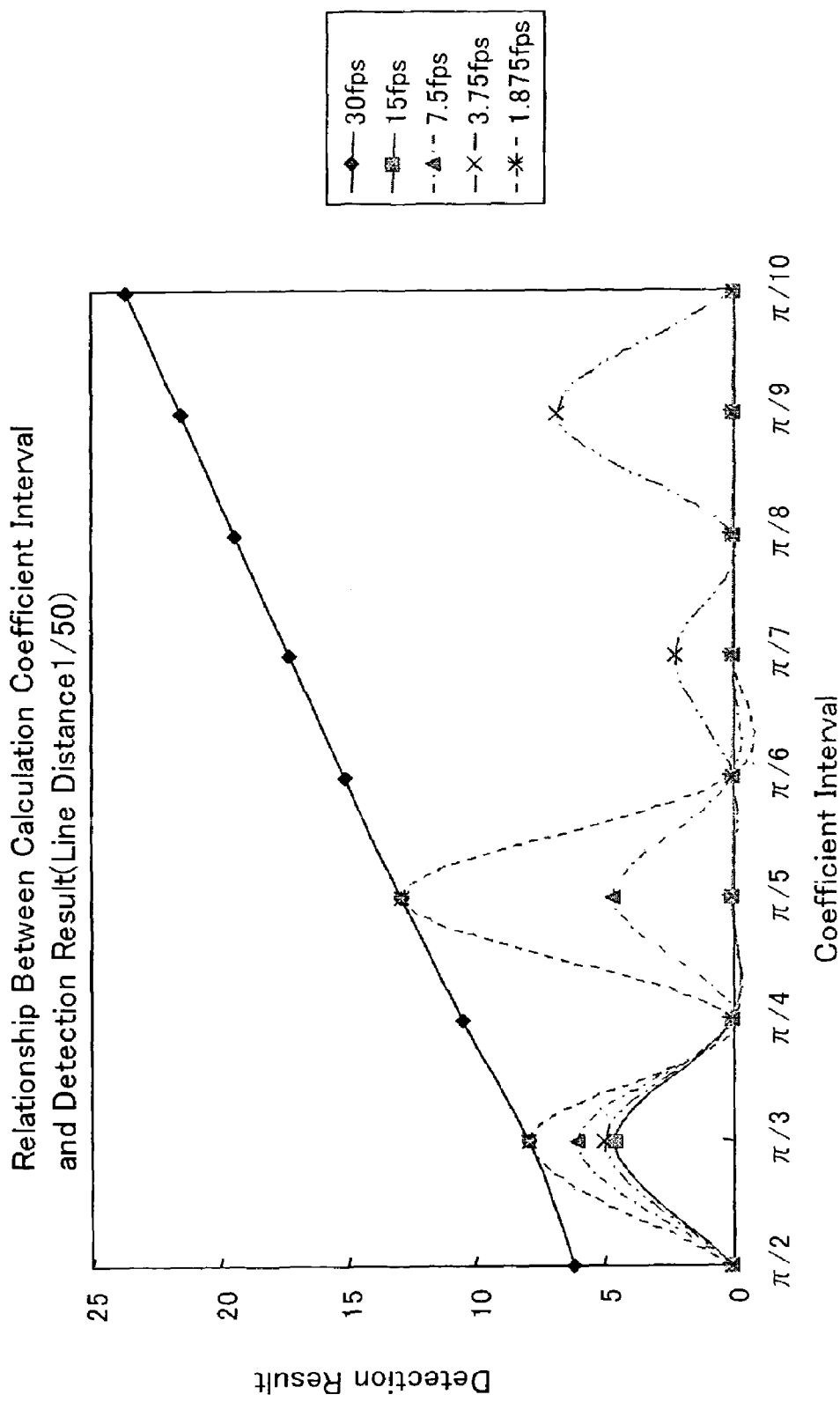
FIG. 14 is a graph showing the relationship of the calculation coefficient interval and detection results when the line interval is 1/50·V.
Figure 15:
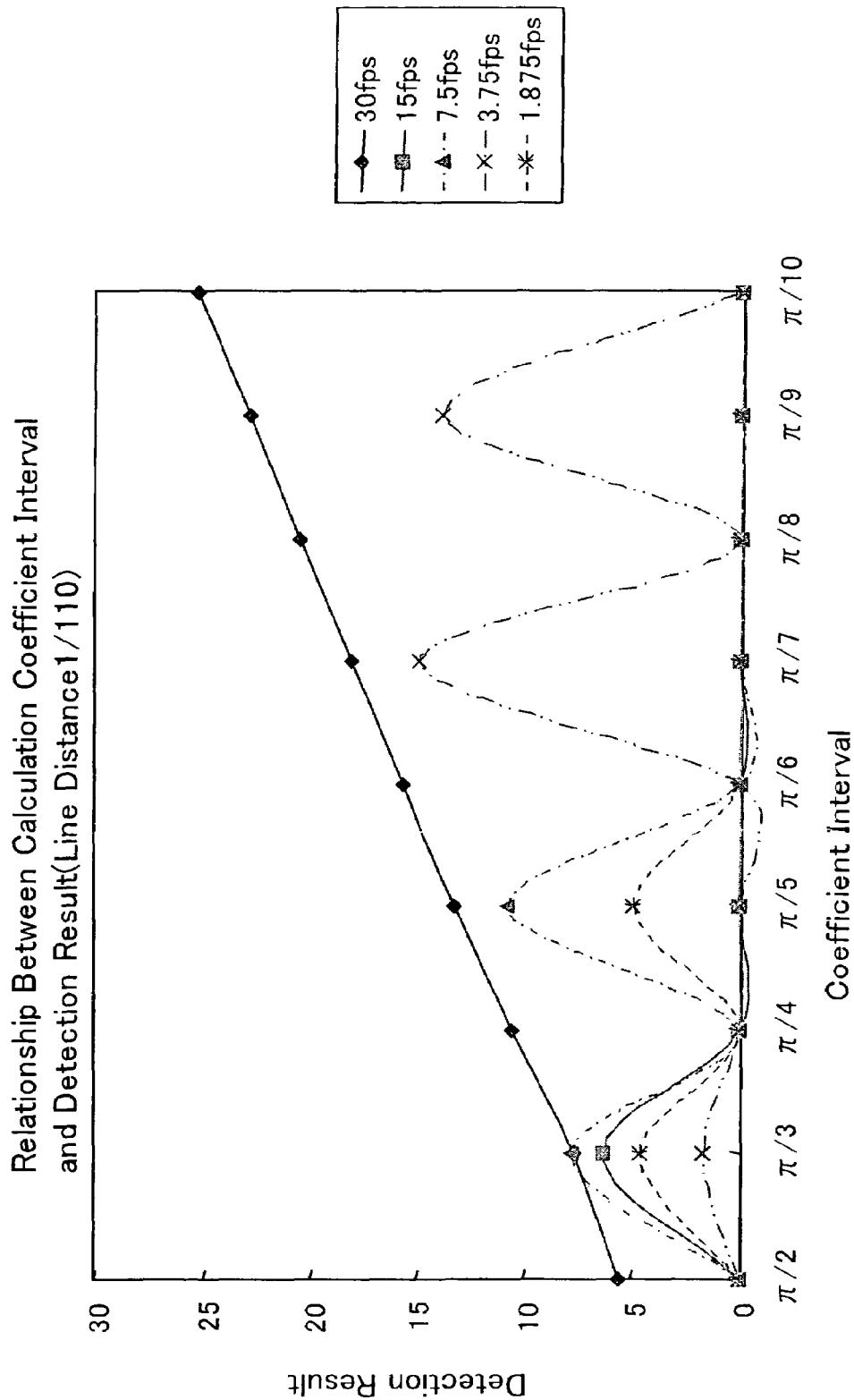
FIG. 15 is a graph showing the relationship of the calculation coefficient interval and detection results when the line interval is 1/110·V.
Figure 16:
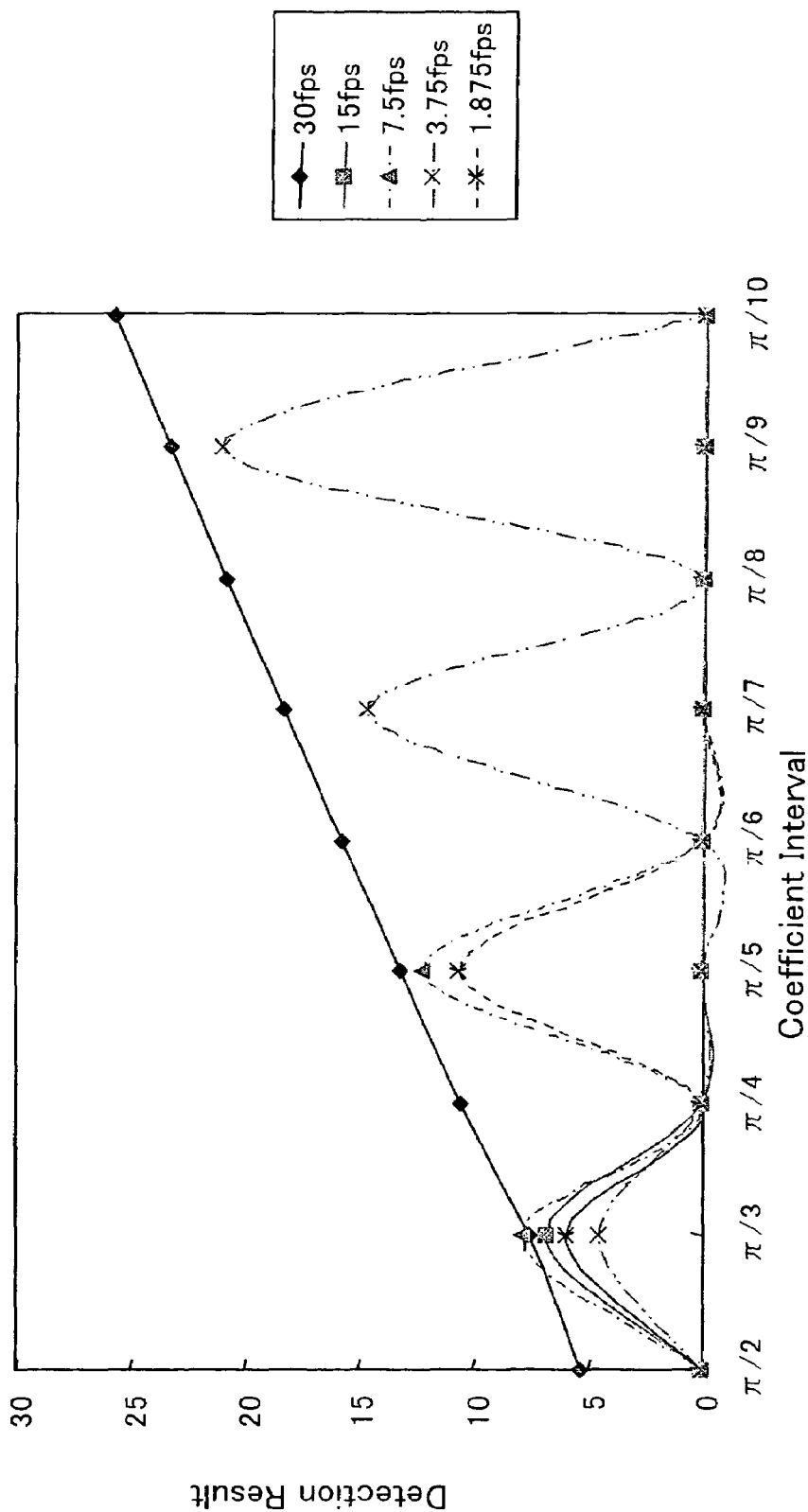
FIG. 16 is a graph showing the relationship of the calculation coefficient interval and detection results when the line interval is 1/200·V.

The relationship of the detection results and the interval of the calculation coefficients cos 0 to cos 5 and sin 0 to sin 5 is shown when the distance D is set to 1/10·V in FIG. 12, 1/40·V in FIG. 13, 1/50·V in FIG. 14, 1/110·V in FIG. 15, and 1/200·V in FIG. 16.

In FIGS. 11 to 16, flicker noise is detectable when the detection result is zero or greater. Accordingly, the flicker noise is detectable for any distance D and any frame rate when the calculation coefficients cos 0 to cos 5 are plotted at intervals of π/3.

Figure 17:
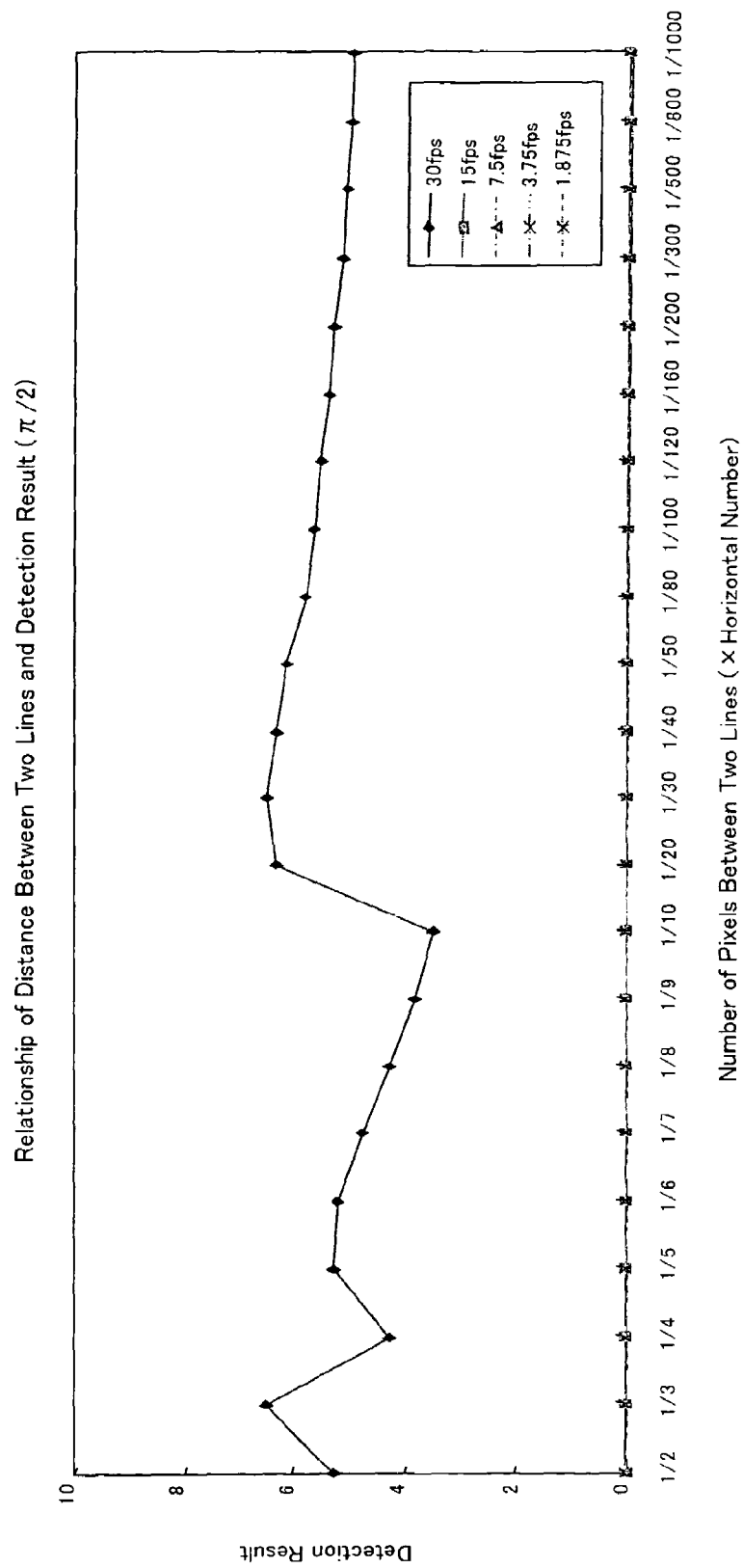
FIG. 17 is a graph showing the relationship of the distance between the average brightness calculation regions and the detection results when the calculation coefficient interval is $\pi/2$.

FIGS. 17 to 22 show the relationship of detection results and the distance D between the average brightness calculation regions 24a and 24b in accordance with different plotting intervals of the calculation coefficients cos 0 to cos 5 and sin 0 to sin 5. FIG. 17 shows the relationship of the detection results and the distance D between the average brightness calculation regions 24a and 24b for the frame rates of 30 fps, 15 fps, 7.5 fps, 3.75 fps, and 1.875 fps when the calculation coefficient plotting interval is set to π/2.

Figure 18:
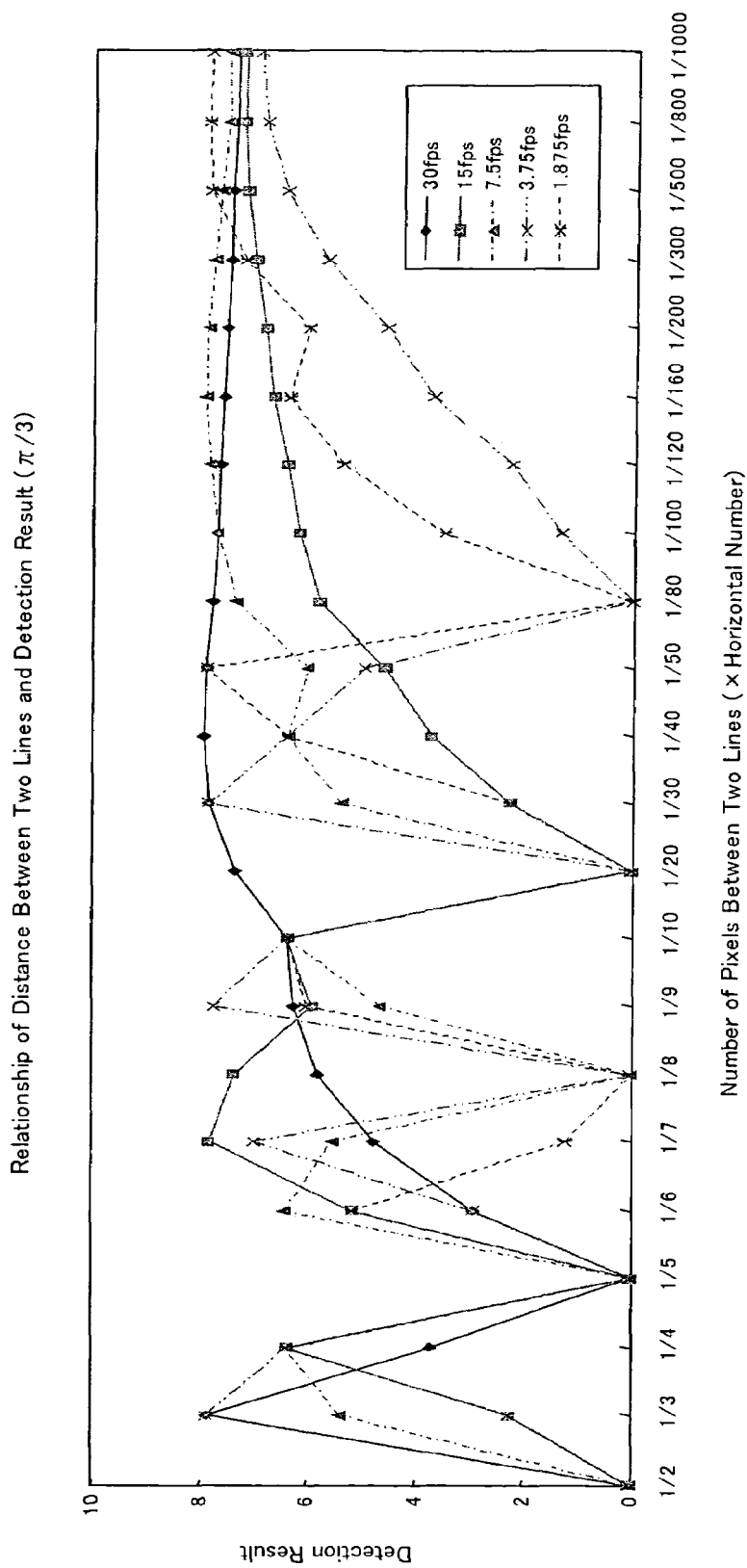
FIG. 18 is a graph showing the relationship of the distance between the average brightness calculation regions and the detection results when the calculation coefficient interval is $\pi/3$.
Figure 19:
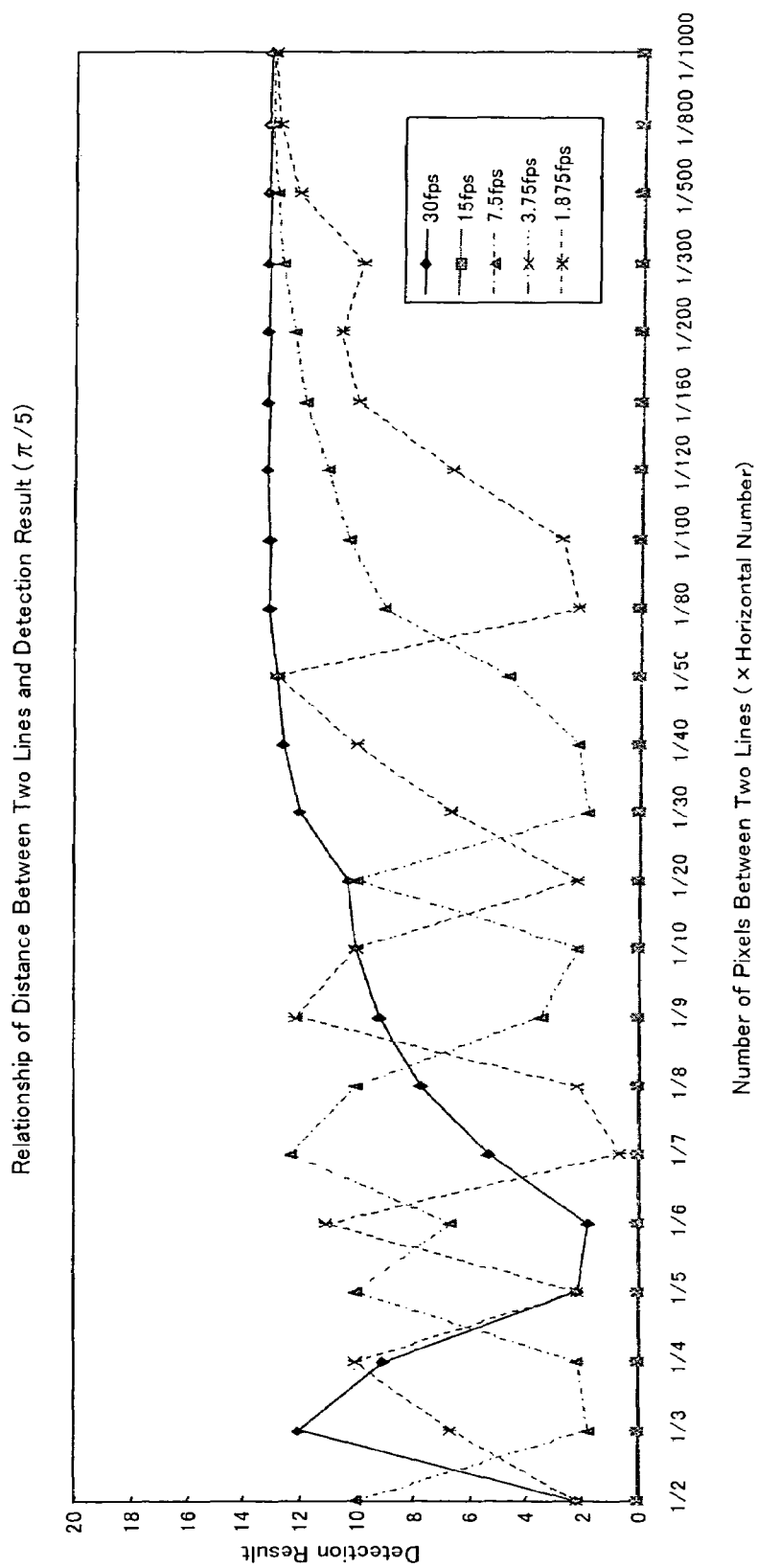
FIG. 19 is a graph showing the relationship of the distance between the average brightness calculation regions and the detection results when the calculation coefficient interval is $\pi/5$.
Figure 20:
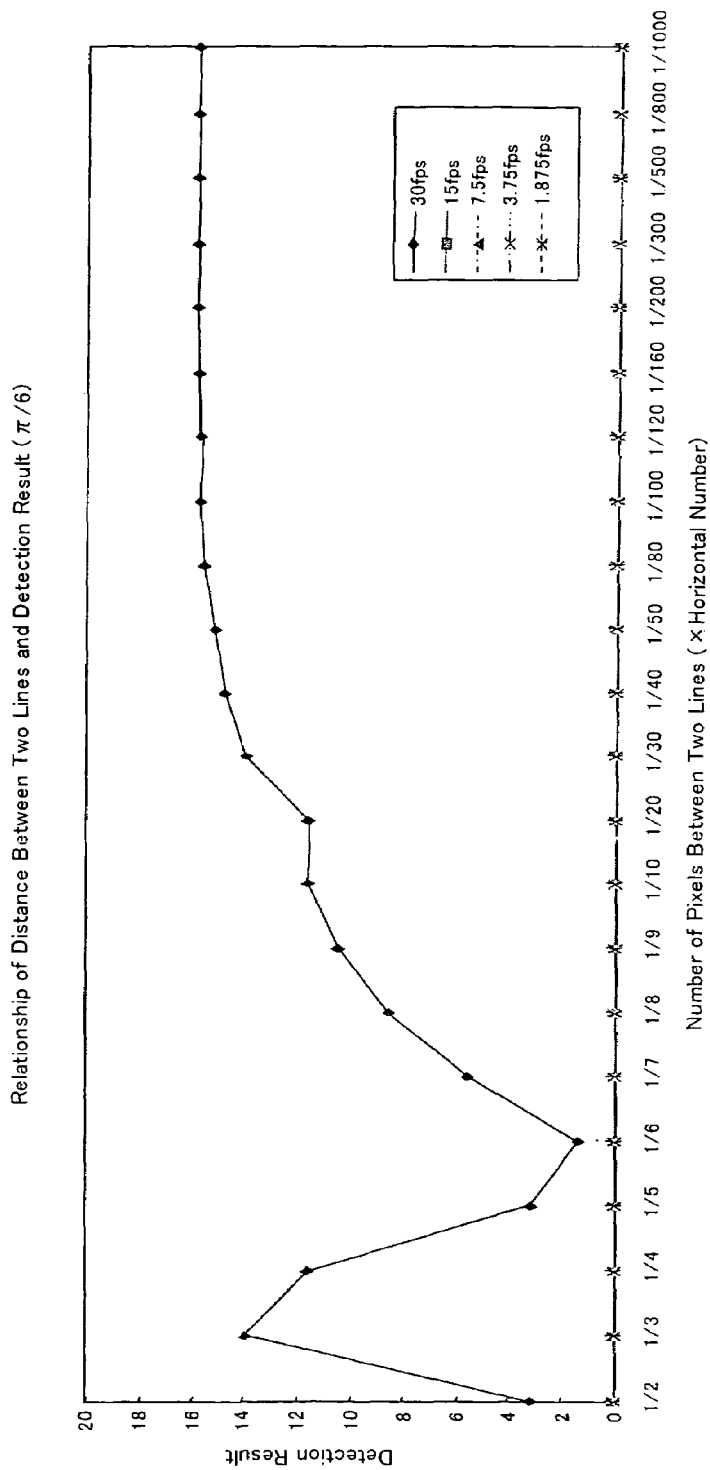
FIG. 20 is a graph showing the relationship of the distance between the average brightness calculation regions and the detection results when the calculation coefficient interval is $\pi/6$.
Figure 21:
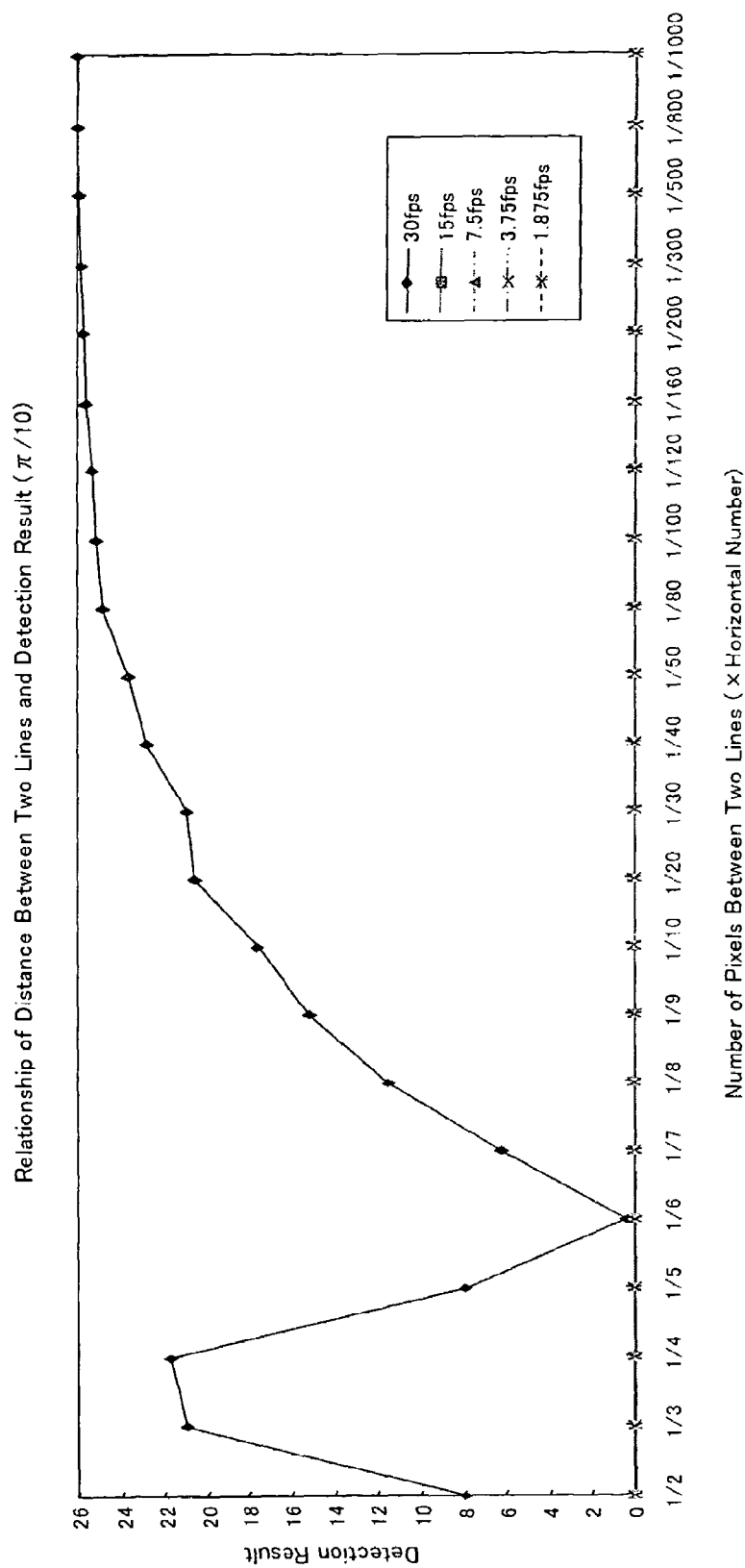
FIG. 21 is a graph showing the relationship of the distance between the average brightness calculation regions and the detection results when the calculation coefficient interval is $\pi/10$.
Figure 22:
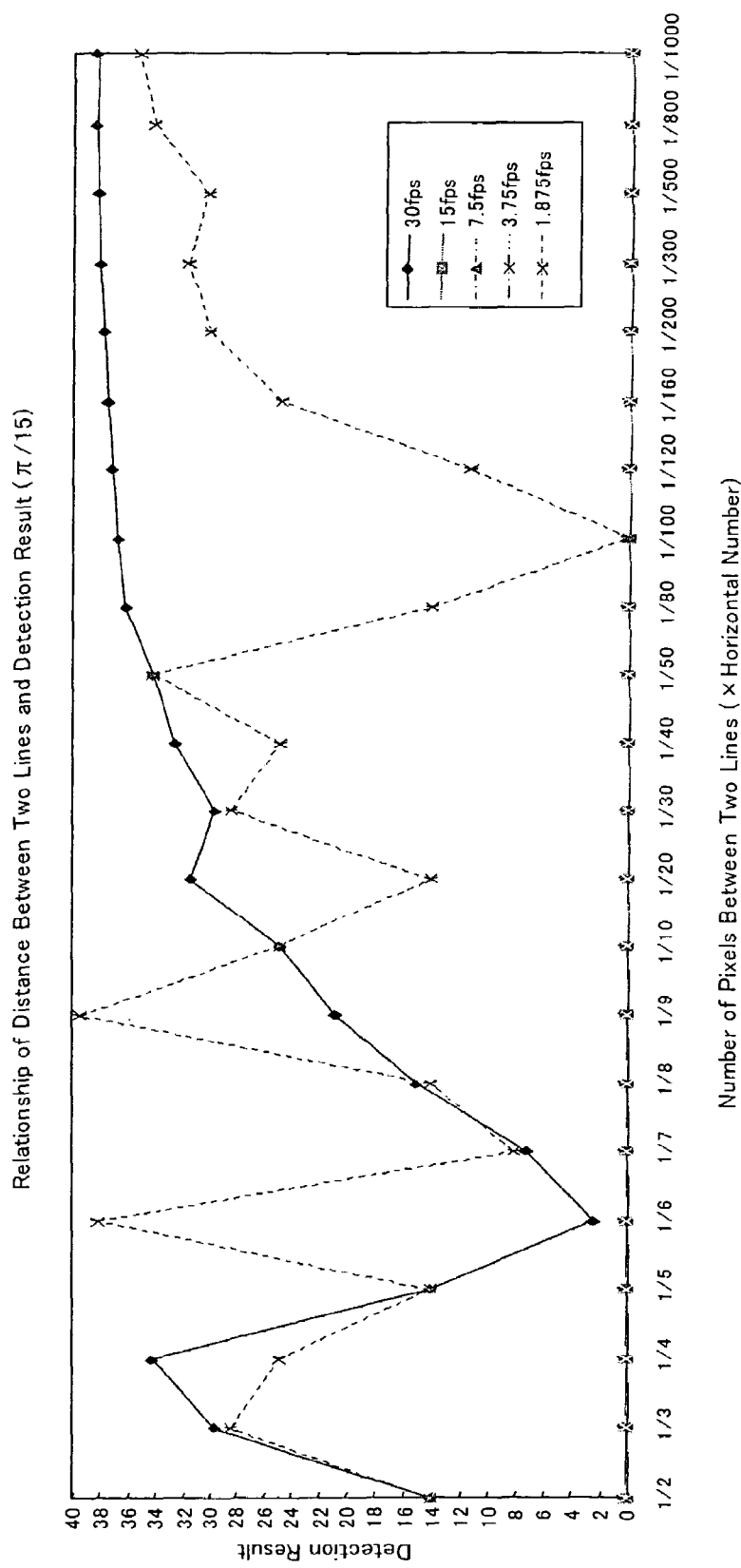
FIG. 22 is a graph showing the relationship of the distance between the average brightness calculation regions and the detection results when the calculation coefficient interval is $\pi/15$.

The relationship of the detection results and the distance D between the average brightness calculation regions 24a and 24b is shown when the calculation coefficient plotting interval is set to π/3 in FIG. 18, π/5 in FIG. 19, π/6 in FIG. 20, π/10 in FIG. 21, and π/15 in FIG. 22.

In FIGS. 17 to 22, flicker noise is detectable when the detection result is zero or greater. Accordingly, as long as the distance D is not 1/2, 1/5, 1/8, 1/20, or 1/80 of the total number V of the horizontal lines, flicker noise is detectable for any frame rate.

Based on the above simulation results, the calculation coefficients cos 0 to cos 5 and sin 0 to sin 5 are obtained by plotting one cycle of the cosine wave 28 and the sine wave 29 by intervals of π/3 and setting the distance D between the average brightness calculation regions 24a and 24b to a value other than 1/2, 1/5/ 1/8, 1/20, or 1/80 of the total number V of the horizontal lines. This enables the detection of flicker noise.

Figure 10:
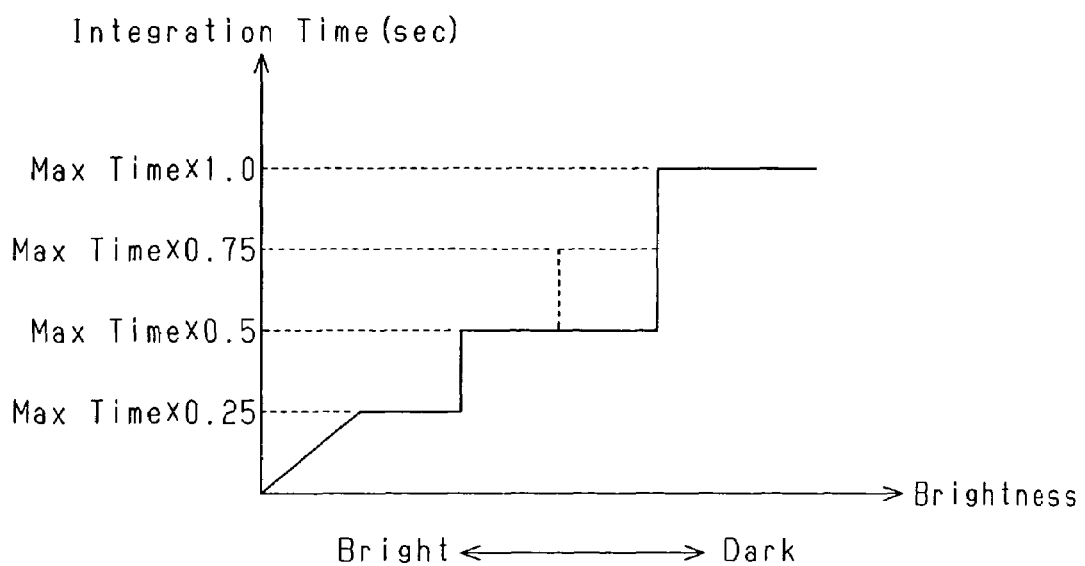
FIG. 10 is a diagram showing integration times selected by a decoder circuit during the detection of flicker noise.

FIG. 10 shows the operation of the decoder circuit 4 during the detection of flicker noise. In the preferred embodiment, the integration time that is selected based on the integration time adjustment signal A2 output from the decoder circuit 4 varies in steps of maximum integration time Max (cycle of one frame)×1, Max×0.5, and Max×0.25. That is, in the preferred embodiment, the step for the integration time of Max× 0.75 is deleted.

If the integration time of Max×0.75 were to be selectable, the integration time of m/20 seconds, during which flicker noise does not exist in either one of the fluorescence cycles 1/120 seconds and 1/100 seconds, would exist. Thus, this step is deleted. Accordingly, the detection of flicker noise is ensured.

The AGC circuit of the preferred embodiment incorporating the noise detection circuit has the advantages described below.

(1) The product sum calculation circuit 8a stores the average brightness Y0 to Y5 of the average brightness calculation regions 24a and 24b for three frames to calculate the product sum calculation value Yf. This shortens the time for obtaining the detection signal FC of flicker noise.

(2) The calculation coefficients cos 0 to cos 5 and sin 0 to sin 5 are obtained by plotting one cycle of the cosine wave 28 and the sine wave 29 by intervals of π/3. Further, the distance D between the average brightness calculation regions 24a and 24b are set to a value other than 1/2, 1/5/ 1/8, 1/20, or 1/80 of the total number V of the horizontal lines. This ensures the detection of flicker noise for frame rates of 30/2$^n$.

(3) During the detection of flicker noise, the integration time selected in accordance with the integration time adjustment signal A2, which is output from the decoder circuit 4, varies in the manner of maximum integration time Max (cycle of one frame)×1, Max×0.5, and Max×0.25. Thus, the integration time of m/20 seconds, during which flicker noise is not produced, is deleted. This ensures the detection of flicker noise.

(4) When determining from the detection signal FC that an image is being generated under a fluorescent light having a fluorescence cycle of 1/100 seconds, the decoder circuit 4 selects the integration time corresponding to the fluorescence cycle of 1/100 seconds. This prevents a flicker noise from being generated in the image plane.

It should be apparent to those skilled in the art that the present invention may be embodied in many other specific forms without departing from the spirit or scope of the invention. Particularly, it should be understood that the present invention may be embodied in the following forms.

The calculation coefficients may be obtained by plotting two or three cycles of the cosine wave 28 and the sine wave 29 at intervals of π/3. By increasing the calculation coefficients in this manner, the flicker noise detection accuracy of the product sum calculation circuit 8a is improved. In this case, the number of stages of the shift registers and the multipliers is increased (twelve each for two cycles, and eighteen each for three cycles). However, the calculation speed of the product sum calculation value Yf is still faster than that in the prior art.

The present examples and embodiments are to be considered as illustrative and not restrictive, and the invention is not to be limited to the details given herein, but may be modified within the scope and equivalence of the appended claims.

What is claimed is:

1. A method for detecting flicker noise in an image plane, the flicker noise being produced in image frames, which are each configured by a plurality of horizontal lines, the method comprising:
    setting two of the horizontal lines as average brightness calculation regions, wherein the two of the horizontal lines are separated from each other by at least one horizontal line of the plurality of horizontal lines;
    calculating an average brightness of the two average brightness calculation regions for each of a plurality of frames in the image plane;
    multiplying each average brightness by a product sum calculation coefficient; and
    adding the products to generate a sum and generating a detection signal for flicker noise based on the sum,
    wherein the product sum calculation coefficient is obtained by plotting one cycle of a sine wave and one cycle of a cosine wave at intervals of π/3.

2. The method according to claim 1, wherein the average brightness is calculated for at least three frames of the image plane.

3. The method according to claim 1, wherein the distance between the average brightness calculation regions is set to a value other than 1/2, 1/5, 1/8, 1/20, and 1/80 of the total number of the horizontal lines per frame.

4. The method according to claim 3, wherein the distance between the average brightness calculation regions is set to 1/40 of the total number of the horizontal lines per frame.

5. The method according to claim 1, wherein the product sum calculation coefficient is obtained by plotting three cycles of a sine wave and three cycles of a cosine wave at intervals of $\pi/3$.

6. The method according to claim 1, further comprising:
generating the image plane based on a predetermined integration time set for each of the horizontal lines; and
setting the predetermined integration time based on the detection signal to a time other than (maximum integration time)×(0.75).

7. The method according to claim 6, wherein the predetermined integration time is set in the order of (maximum integration time)×(1), (maximum integration time)×(0.5), and (maximum integration time)×(0.25).

8. A method for detecting flicker noise in an image plane, the flicker noise being produced in image frames, which are each configured by a plurality of horizontal lines, the method comprising:
setting two of the horizontal lines as average brightness calculation regions that are separated from each other by a distance set to a value other than 1/2, 1/5, 1/8, 1/20, and 1/80 of the total number of the horizontal lines per frame;
calculating an average brightness of the two average brightness calculation regions for each of at least three frames in the image plane;
multiplying each average brightness by a product sum calculation coefficient; and
adding the products to generate a sum and generating a detection signal of flicker noise based on the sum,
wherein the product sum calculation coefficient is obtained by plotting one cycle of a sine wave and one cycle of a cosine wave at intervals of $\pi/3$.

9. The method according to claim 8, wherein the distance between the average brightness calculation regions is set to 1/40 of the total number of the horizontal lines per frame.

10. The method according to claim 8, further comprising:
generating the image plane based on a predetermined integration time set for each of the horizontal lines; and
setting the predetermined integration time based on the detection signal to a time other than (maximum integration time)×(0.75).

11. The method according to claim 10, wherein the predetermined integration time is set in the order of (maximum integration time)×(1), (maximum integration time)×(0.5), and (maximum integration time)×(0.25).

12. A method for detecting flicker noise in an image plane due to fluorescent light, the flicker noise being produced in image frames, which are each configured by a plurality of horizontal lines, the method comprising:
generating an image plane based on a first integration time set for each horizontal line in correspondence with fluorescent light having a first fluorescence cycle;
setting two of the horizontal lines as average brightness calculation regions, wherein the two of the horizontal lines are separated from each other by at least one horizontal line of the plurality of horizontal lines;
calculating an average brightness of the two average brightness calculation regions for each of a plurality of frames in the image plane;
multiplying each average brightness by a product sum calculation coefficient, the product sum calculation coefficient being obtained by plotting one cycle of a sine wave and one cycle of a cosine wave at intervals of $\pi/3$; and
adding the products to generate a sum and generating a detection signal for flicker noise based on the sum,
wherein when the detection signal indicates that flicker noise is included in the image plane, the first integration time is changed to a second integration time set for each horizontal line in correspondence with a fluorescent light having a second fluorescence cycle.

13. The method according to claim 12, the first fluorescence cycle is 1/120 seconds and the second fluorescence cycle is 1/100 seconds.

14. The method according to claim 12, wherein the second integration time is set in the order of (maximum integration time)×(1), (maximum integration time)×(0.5), and (maximum integration time)×(0.25).

15. A circuit for detecting flicker noise from brightness data generated in units of a frame, the circuit comprising:
an average brightness calculation circuit for receiving the brightness data in units of a frame and calculating an average brightness of a predetermined average brightness calculation region;
a product sum calculation circuit, connected to the average brightness calculation circuit, for calculating a product sum calculation value with the average brightness in each of a plurality of frames and a predetermined product sum calculation coefficient; and
a comparison circuit, connected to the product sum calculation circuit, for comparing the product sum calculation value with a predetermined threshold value to generate a detection signal based on the comparison result,
wherein the product sum calculation coefficient is obtained by plotting one, two, or three cycles of a sine wave and of a cosine wave at intervals of $\pi/3$.

16. The circuit according to claim 15, wherein the product sum calculation circuit includes:
a shift register for storing the average brightness in each of the frames;
a multiplier, connected to the shift register, for multiplying each average brightness stored in the shift register with a predetermined product sum calculation coefficient to generate a product output signal; and
an adder, connected to the multiplier, for adding the product output signals of the multiplier to generate the product sum calculation value.

17. The circuit according to claim 15, wherein one frame includes a plurality of horizontal lines, and the predetermined average brightness calculation region is formed by two average brightness calculation regions separated from each other by a distance other than 1/2, 1/5, 1/8, 1/20, and 1/80 of the total number of the horizontal lines per frame.

18. The circuit according to claim 17, wherein the distance between the two average brightness calculation regions is set to 1/40 of the total number of the horizontal lines per frame.

19. The circuit according to claim 15, wherein one frame includes a plurality of horizontal lines, and the average brightness calculation circuit is provided with brightness data that is generated based on a predetermined integration time set to a time other than (maximum integration time)×(0.75) for each horizontal line.

20. The circuit according to claim 19, wherein the predetermined integration time is set in the order of (maximum integration time)×(1), (maximum integration time)×(0.5), and (maximum integration time)×(0.25).

21. The circuit according to claim 15, wherein one frame includes a plurality of horizontal lines, the brightness data provided to the average brightness calculation circuit is generated based on a first integration time set for each horizontal line in correspondence with a fluorescent light having a first fluorescence cycle, the circuit further comprising:

a decoder circuit, connected to the comparison circuit, for generating a signal that changes the first integration time to a second integration time set for each horizontal line in correspondence with a fluorescent light having a second fluorescence cycle when the detection signal generated by the comparison circuit indicates that flicker noise is being produced.

* * * * *